Figure 1:
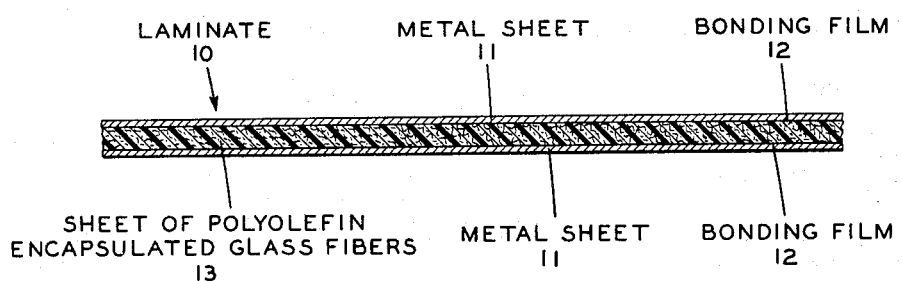

Nov. 14, 1967 A. ZUNICH ET AL 3,352,742

LAMINATES

Filed March 6, 1963

United States Patent Office 3,352,742
Patented Nov. 14, 1967

3,352,742
LAMINATES
Alexander Zunich, Lincolnwood, and Donald Shade and Frank A. Mulec, Chicago, Ill., assignors to National Lead Company, New York, N.Y., a corporation of New Jersey
Filed Mar. 6, 1963, Ser. No. 263,202
11 Claims. (Cl. 161—125)

This invention relates to drawn laminated structures, including those having compound curvature, and methods for producing the same. It further includes laminated materials suitable for employment in draw dies such as are commonly employed in the automotive, aircraft and allied metal-fabricating industries and the methods of preparation of said laminated materials.

Many millions of shaped metal structures are fabricated each year for use in automobiles, trucks, planes, etc. These shaped structures, usually possessing a greater or lesser degree of compound curvature, are normally produced by the so-called "draw die" technique. Basically this technique involves the use of a female die, a male stamp or punch and a holding ring, appropriately arranged in a draw press. The press furnishes the power for forming and the means of holding the female die, male stamp and holding ring that do the actual forming of the metal. In a simple drawing operation a sheet of metal is accurately positioned over the lower section (usually the female die), retained in such position by a holding ring which applies a predetermined pressure on the outer edges of the sheet, and the upper section (usually the male punch) is then brought down by the press, thus drawing the metal into the die and forming the desired shape. The sheet metal actually flows in the cold state during the pressure forming operation, and, thus, it becomes necessary to employ a sufficient thickness of the metal sheet so as to preclude the possibility of rupture or tearing of the metal sheet during the forming operation. While the "draw die" technique is widely used, it is obvious that in many instances much heavier metal pieces are produced than are necessary in view of the actual strength requirements of the finished structural component. For example, a particular shaped or drawn piece might only require a starting thickness in sheet steel of thirty thousandths of an inch with respect to strength of shaped or drawn article, but it might be necessary actually to employ double the aforementioned thickness of sheet in order to provide the required depth of draw and yet prevent tearing during the drawing operation.

We have now developed, according to the present invention, methods of first forming thin metal-plastic laminated sheets into shaped structures useful in automotive, plane, boat and related metal-fabricating industries. The products of the present invention represent substantial savings in weight over the metal structures heretofore employed, while still yielding adequate strength. Further advantages such as improvements in sound-deadening, vibration-dampening, surface treatment, and others will also be apparent from the following more detailed description.

Figure 2:
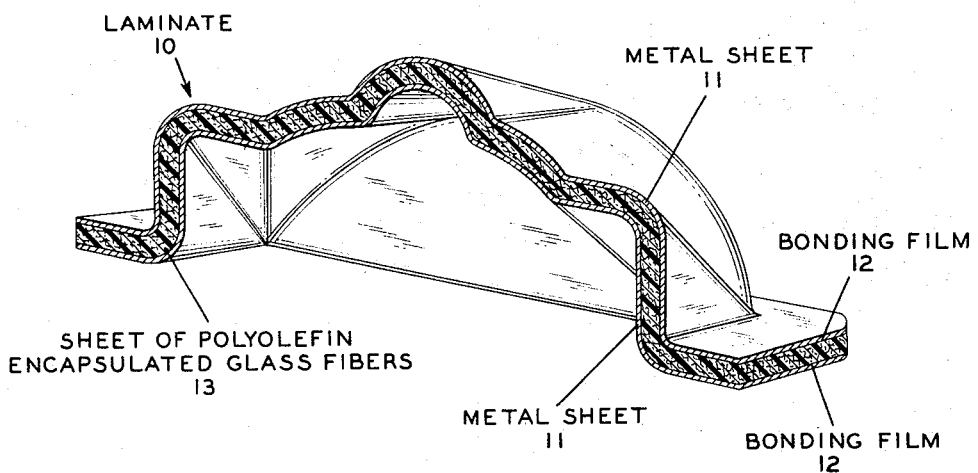

An object of the present invention, therefore, is the production of laminated materials highly suitable for forming drawn laminated structures possessing compound curvature. It is also an object to produce novel drawn laminated structures. Another object is to provide methods for making drawn laminated structures. Still another object is the production of metal-plastic laminates suitable for employment in "draw-dies" to form shaped structures. An additional object is to provide methods of preparing such laminates. Yet a further object is to provide means for obtaining strong bonds between the various layers or sheets making up the laminate. These and other objects will be apparent to those skilled in the art from the present description, taken in conjunction with the appended drawings, in which:

FIG. 1 is a cross-section, somewhat enlarged, of a laminate in accordance with the present invention with the parts magnified; and FIG. 2 is a perspective view, somewhat enlarged, of the laminate of FIG. 1, after being drawn into a structure having compound curvature.

THE LAMINATES

The laminates of this invention comprise alternate sheets of thin metal and sheets of polyolefinic encapsulated glass fibers. The laminated sheets, as formed herein, may be of three-ply sandwich construction or may be of multi-ply construction. While two-ply laminates, i.e., one metal sheet bonded to one sheet of encapsulated glass fibers, have utility as wall board and the like, it has been found necessary to employ at least a three-ply or sandwich laminate (as shown in FIG. 1) when drawing shaped structures as heretofore mentioned. This three-play laminate consists of two outer layers of thin metal sheet having interposed therebetween and bonded thereto a sheet of the polyolefin encapsulated glass fibers. Thus in FIG. 1 of the drawing the laminate 10 is made up of two thin sheets of metal 11 bonded with bonding films 12 to a sheet 13 of polyolefin encapsulated glass fibers.

Metals which may be employed in the form of laminating sheets may be either ferrous or non-ferrous. Typical ferrous metals are the low carbon steels, stainless steels, galvanized iron, and the like, as are commonly used in drawing operations in the automotive industry today. Typical non-ferrous metals falling within the purview of this invention are aluminum, magnesium, zinc, alloys of these metals, and the like. It is also contemplated to employ other non-ferrous metals which are difficultly drawable, as for example, titanium.

The particular plastic polyolefin encapsulated fiber glass sheets which are an essential part of the laminate are in and of themselves a unique article of manufacture. Copending application U.S. Ser. No. 131,928, filed Aug. 16, 1961 by Joseph Orsino, Daniel F. Herman, Jack J. Brancato and Uno Kruse, entitled "Fiber-Polyolefin Compositions and Process of Making Same," and assigned to the same assignee as the present application, describes and claims the preparation of polyolefinic encapsulated silicates, including glass fibers and also the subsequent formation of sheets, etc., from the polyolefinic encapsulated glass fibers. It is intended to incorporate by reference the disclosure of said copending application in its entirety.

Basically, in accordance with the disclosure of said copending application, the glass fibers are treated with the components of a multi-component catalyst system before said components, as for example, titanium tetrachloride and triethyl aluminum, have fully reacted with each other. The thus catalyst-treated glass fibers are then contacted with an aliphatic 1-olefin containing less than six carbon atoms, as for instance ethylene, propylene, etc., for a sufficient length of time and under conditions to form a shell of polymer on the fibers. The polyolefin encapsulated fibers may then be laid down from an aqueous slurry as a sheet, as for example on typical paper-making equipment. The formed sheet, after dewatering, is then passed through a drying-sintering chamber operated at temperatures approaching the melting point of the particular polyolefin. The polyolefin melts slightly on its surface, and, upon cooling, a bond is formed where the encapsulated glass fibers cross one another. Sometimes it is helpful in making the wet sheet to incorporate small amounts, say 5% to 10% by weight of raw or unencapsulated glass fibers. This is done merely to increase the so-called wet strength of the sheet as it is initially formed on the paper making machine. Other methods of fabrication can be employed wherein it is not necessary to employ the raw glass fibers.

The laminates employed according to the instant invention may be prepared by stacking the various components, i.e., sheets of metal and sheets of polyolefin encapsulated glass fibers, together and then subjecting the stacked sheets to heat and pressure within certain controlled conditions as will be more fully described. As previously mentioned it is necessary to produce a strong bond between the various laminations particularly when the sheet laminate is to be used for making deep draws.

Various techniques may be employed so as to insure a strong bond. One technique which has been found to give exceptionally good results when low carbon steel plates are to be bonded to polyethylene encapsulated glass fiber sheets is as follows:

The steel sheet is first subjected to a cleaning operation to remove dirt and grease from the sheet surface. For example, immersion in or washing with a hot aqueous sodium metasilicate solution is preferred. Also, other hot alkaline solutions or organic solvents may be employed. The cleaned steel sheets are then washed with water and then forced air dried or left wet after which they are subjected to a chemical plating operation during which a very thin film of copper having a partially oxidized surface is applied to the surface of the metal sheet to be bonded to the polyolefin encapsulated glass fiber sheet. An excellent chemical plating solution, especially for low-carbon steel sheets, is one containing an aqueous solution of a copper salt. Such a solution may consist of 250 cc. of water, 5 grams of copper sulphate, 3 cc. concentrated sulphuric acid, 0.5 gram ammonium nitrate (oxidant) and 0.1 gram chromium trioxide. The aforementioned plating solution employed as a cold solution, approximating room temperature, is preferably wiped or sprayed briefly onto the steel plate after which cold tap water is poured or sprayed promptly over the sheet as a rinse.

The resulting film appears to be a thin partially oxidized copper film, the oxide formation being effected by the action of the ammonium nitrate which is present in the plating solution. Soluble persulfates or peroxides will also provide the oxidation action. The plated sheet is then allowed to air dry. If desired, the oxidant may be omitted from the solution, but this of course does not give the quick oxidation of the copper film as is desired in commercial applications. If the oxidant is not used, it then becomes necessary to permit the copper plated steel sheets to age for a period of time sufficient to permit air oxidation of the thin copper plating. Even when treated with an oxidant, aging appears to improve the bonding properties of the film. This aging period may be from several hours to several days depending upon the temperature, atmosphere, etc., in which the aging occurs.

In the case of stainless steels the bonding film may be provide by treating the cleaned steel sheets with an aqueous solution of hydrofluoric acid with nitric or sulfuric acids. With aluminum sheets the bonding film may be provided by anodizing the cleaned sheets or treating the cleaned sheets with an aqueous solution of sodium dichromate. Galvanized iron sheets need only be degreased and then pickled because the treated zinc coating acts as a suitable bonding film.

As will be appreciated, the treatment preferred to provide a strong bond between the metal sheet and the sheet of encapsulated glass fibers will vary depending upon the metal employed and may readily be determined by those skilled in the art.

As stated above the laminate is formed by the application of heat and pressure. A typical and preferred laminating operation employing metal sheets having the aforementioned bonding surface or film and sheets of polyethylene encapsulated glass fibers is as follows:

Several sheets of polyethylene encapsulated glass fibers are placed together as a core between two thin sheets of metal. The encapsulated sheets should preferably be ones which have been sintered and calendered. While the sheets of encapsulated glass fibers may contain varying amounts of glass fibers, it has been found that amounts of from about 10% to about 40% by weight of glass fibers (with the remainder of 90% to 60% being polyolefin) are most desirable. In accordance with one preferred embodiment, the encapsulated sheets shall consist of 85% by weight of polyethylene and 10% by weight of encapsulated glass fibers and 5% by weight of unencapsulated glass fibers, the glass fibers being about one-eighth inch in length and about 0.0037 inch in diameter. These encapsulated sheets preferably have a weight of betwenn about 110–140 grams per square foot at a thickness of 0.125 inch. The surfaces of the metal sheets adjacent the encapsulated glass fiber sheets have the bonding film or surface as shown at 12 in FIG. 1. The stacked sheets are then placed between two platens in a hydraulic press, the platens being capable of being heated and cooled. The platens and the unbonded laminates are then heated to between about 275° F. and about 350° F., preferably to about 300° F., in the absence of pressure. The unbonded laminate sheets are then subjected to pressures from about 200 p.s.i. to about 1200 p.s.i., preferably about 750 p.s.i., for a dwell time approximating 30 seconds to one minute. The platens and laminates are then quickly cooled to at least about 260° F. while the pressure is maintained. At temperatures of about 260° F., or less, the pressure may be released and the bonded laminate removed from the platens. As will be appreciated, the particular conditions of heat, pressure, dwell time, cooling temperature, etc., will vary depending upon the particular materials making up the laminate, and the most suitable conditions may readily be determined by those skilled in the art from the teachings of the present disclosure.

PREPARATION OF THE ENCAPSULATED GLASS FIBERS

The preparation of the polyolefin encapsulated glass fibers is in accordance with said copending U.S. application Ser. No. 131,928.

One simple and convenient way of producing the polyolefin encased glass fibers is by the slurry method in which the glass fibers are suspended in a suitable inert liquid medium, such as an organic liquid, which does not react with either the fiber, the olefin, or the polymer to be formed thereon. Suitable inert organic liquids or solvents include such hydrocarbons as: pentane, hexane, heptane, cyclohexane, benzene, xylene, toluene, etc. The glass fibers may be treated with one of the catalyst components before or after it is placed in the suspending liquid. The other catalyst component is then brought into contact with the glass fibers in the suspending liquid and the olefin monomer fed into the system, while agitating the slurry. It is preferred to add first the transition metal component of the catalyst system to encase glass fibers. Desirably, the slurry containing the glass fibers and at least one of the catalyst components is heated, as by refluxing. Heating appears to provide a more tenacious bond between the glass fibers and the polyolefin.

The glass fibers which are encapsulated and from which the sheets are made may be of many sizes, although it is desirable that the length be at least 5 times the thickness and the length be at least about 50 to 100 microns up to about 0.5 inch. These fibers or filaments are encapsulated by treatment with a two component catalyst system to form active polymerization sites on the fibers. The olefin is then added to the catalytically treated fibers and the monomer is polymerized at the surface sites of each and formed thereon. The formation of the polymer on the fibers is substantially uniform, substantially all of the fibers being encased in shells of the polymer.

Polymers of any of the aliphatic 1-olefins having less than 6 carbon atoms may be employed to encapsulate the glass fibers. These include the simplest 1-olefins such as ethylene, propylene, butene-1 and the like and also di-olefins such as butadiene-1,3 and isoprene. These 1-olefins may be used to form homopolymers, or mixtures of them may be polymerized together to form various copolymers. In addition, other compounds which are known to copolymerize with these 1-olefins to form useful products may be employed in combination therewith. It is preferred to use ethylene or propylene which have the outstanding advantages of being gases at ordinary temperatures, of being relatively inexpensive and available in large quantities, and of producing polymers of high molecular weight having very desirable properties.

Two component catalyst systems which have been found useful in encapsulating the glass fibers include any system having two or more components which, when mixed together, react to form a material that initiates the polymerization of the 1-olefins, and which have at least one component that will become fixed or attached in some way on the glass fibers when brought in contact therewith prior to the complete reaction of such component with the other components of the system. In general, two component systems which are particularly suitable are those in which one component is an organometallic reagent such as an alkyl or aryl compound of one of the metals lithium, sodium, potassium, magnesium, calcium, zinc, cadmium, boron, or aluminum, and the other component is a transition metal compound such as a halide or ester of titanium, zirconium, vanadium or chromium. Other similar catalyst systems can be used as will be apparent to those skilled in the art of producing polyolefins.

Exemplary of the organometallic component of a satisfactory catalyst system are: butyllithium, amylsodium, phenylsodium, dimethyl magnesium, diethyl magnesium, diethyl zinc, methyl magnesiumbromide, butyl magnesium bromide, phenyl magnesium chloride, trimethylaluminum, triisobutylaluminum, triisopropylaluminum, trioctylaluminum, tridodecylaluminum, dimethylaluminum bromide, diethylaluminum chloride, ethylaluminum dibromide, isobutylaluminum sesquichloride, dipropylaluminum iodide, diisobutylaluminum fluoride, diisobutylaluminum bromide, diethylaluminum hydride, ethylaluminum hydride, diisobutylaluminum hydride, etc., and complexes of such organometallic compounds, as for example, sodium aluminum tetrabutyl, sodium aluminum triethylchloride, etc.

Exemplary of the transition metal compounds of the two component catalyst system are: zirconium tetrachloride, titanium tetrachloride, titanium trichloride, vanadium dichloride, vanadium oxychloride, vanadium trifluoride, vanadium trichloride, vanadyl trichloride, vanadium oxydichloride, chromium trichloride, alkyl vanadates, alkyl titanates, etc.

Among the two component catalyst systems which may be used to encapsulate the glass fibers are: (1) a compound of the formula: $MX_p$ with (2) a compound of the formula: $R_{(z-x)}M'Y_x$. In these formulae, M is a metal from Groups IV-B, V-B, and VI-B of the Periodic Table; X is a halide or alkoxyl group, and $p$ is the valence of M. R is an aryl or alkyl radical, M' is a metal from Groups I-A, II-A, II-B and III-A of the Periodic Table. Y is hydrogen or a halide radical. $z$ is the valence of M' and $x$ is zero, 1 or 2.

As will be evident to those skilled in polymer chemistry, it is important when using one of the catalyst systems discussed above to conduct the polymerization under substantially oxygen-free, carbon dioxide-free and anhydrous conditions since the activity of these catalyst systems is impaired by the presence of any substantial amount of oxygen, carbon dioxide or water. Oxygen is readily removed by sweeping the reaction vessel with nitrogen or other inert gas. Water may be avoided by employing dry materials or removing from the system by azeotropic distillation of the organic suspending solvent, such as toluene.

The polymerization of the olefin on the glass fibers may be carried out at atmospheric pressure or higher pressure if desired, and over a wide range of temperature. Ordinarily, the polymerization proceeds rapidly at atmospheric pressure and at a temperature between about 20° C. and about 100° C. The amount of polymer formed on the glass fibers will vary with the time of the polymerization reaction, the particular catalyst used and the particular monomer or monomers being polymerized. Polyolefin encased glass fibers, wherein the polymer content is high, such as about 60 to 90%, are particularly suitable for fabricating the sheets of encapsulated glass fibers.

After filtering the polyolefin encapsulated glass fibers from the reaction slurry, they are preferably washed with water and formed into porous sheets by suspending them in water, placing the resulting suspension on the papermaker's screen or felt and removing the water by suction. The sheets are then desirably hot air-dried and compressed with heat and pressure. One suitable compression is that capable of forming a sheet about 0.125 inch thick and having a weight of between about 110 and 140 grams per square foot.

DRAWING OF THE LAMINATED SHEETS

The sheet metal-polyolefin encapsulated glass fiber laminates prepared according to this invention are particularly suitable for employment in deep drawing operations to produce shaped structures having a greater or lesser degree of compound curvature. The particular three ply, i.e. sheet steel-encapsulated glass fiber sheet-sheet steel laminate or sandwich, for example, has been used to make deep draws of eight inches which is about the most severe draw one is likely to encounter in drawing operations.

In order to emphasize the weight saving in using sandwich laminates of this invention in place of metal sheets, the following comparison is offered.

In the production of one particular design embodying a high degree of compound curvature and a very deep draw approximating eight inches, it was necessary to employ a sheet of low carbon steel having a thickness of 0.075 inch. An identical form was produced in the same die from a laminated sandwich having two outer low carbon steel sheets of only 0.015 inch thickness each and having a core of 2 sheets of polyethylene encapsulated glass fibers which after compression had a total thickness of 0.080 inch. It should be emphasized that a single sheet of the same low carbon steel having a thickness of 0.030 inch (equivalent to the total thickness of the two metal sheets of the sandwich) could not ordinarily be used to form this particular draw inasmuch as the metal sheet would not flow properly in the drawing operation but rather would rupture or tear.

The drawing of the laminate is conducted in accordance with the normal "draw die" technique described hereinabove, employing a female die, a male stamp or punch and a holding ring in conjunction with the forming press. The drawing operation is conducted without the employment of heat. A drawn article in accordance with the present invention is illustrated by FIGURE 2 of the accompanying drawings in which the parts are numbered corresponding to the parts of FIG. 1.

In order more clearly to disclose the nature of the present invention, the following examples illustrating the invention are disclosed. It should be understood, however, that this is done solely by way of example and is intended neither to delineate the scope of the invention nor limit the ambit of the appended claims. In the examples which follow, and throughout the specification, the quantities of materials are expressed in terms of parts by weight, unless otherwise specified.

Example I

A. PREPARATION OF POLYETHYLENE SHEETS

Glass fibers were encapsulated with polyethylene as follows:

50 pounds of dry glass fibers (milled glass fibers about 1/8 inch long and about 0.0037 inch in diameter coated with starch binder) were added with 3400 pounds of toluene in a 500 gallon reactor. The mixture was azeotroped for 5 hours to dry the suspension of fibers in toluene. The suspension was cooled to a temperture of 100° F. and 10 lbs. of titanium tetrachloride were added, followed by moderate heating of the mixture to provide etching of the glass fibers by the titanium chloride and to provide greater adhesion of the titanium chloride to the glass fibers. The mixture was cooled to a temperature of 120° F. 33 lbs. of triethyl aluminum (in the form of a 20% solution in dry toluene) were added. During the entire operation thus far, the system was maintained in an atmosphere of dry nitrogen gas. Ethylene was introduced into the mixture at a rate of 15–16 cubic feet every 10 minutes for the first 1½ hours, then the rate was increased to 30–35 cubic feet every 10 minutes. After 1300 cu. ft. of ethylene had been added, the absorption of ethylene ceased. The reaction mixture was neutralized with 3 lbs. of aqueous ammonia which adjusted the pH of the mixture to between 7 and 8. The reaction mixture was centrifuged and solid material steam distilled for 3 hours after which there was no noticeable odor of toluene. The yield comprised encased glass fibers containing about 85 parts by weight of polyethylene for each 15 parts of glass fibers. Miscoscopic examination showed that the glass fibers had very heavy individual casings of polyethylene about them and that there was no free polyethylene present apart from the fibers.

An aqueous slurry was made up of the encapsulated glass fibers. The aqueous slurry was agitated. After terminating the agitation the particles containing knots of glass fibers sank to the bottom of the tank and the desirable unknotted material remained in suspension. The suspended material was skimmed off and comprised 400 pounds of polyethylene encapsulated glass fibers. To this material there was added 20 pounds of unencapsulated glass fibers (milled glass fibers about ¼" long and about 0.0037" in diameter) so that the mixture now comprised about 85% encapsulating polyethylene, 10% of encapsulated glass fibers and 5% of free, unencapsulated glass fibers (all percentages by weight). About an 1800 gallon aqueous slurry was formed of the mixture of fibers to which was added 720 grams of a 75% aqueous solution of Aerosol OT (dioctyl sodium succinate) and 6 pounds, 7 ounces of aluminum sulfate. The resulting slurry was passed through a Claflin refiner twice at the rate of 3 to 4 seconds per gallon and the refiner adjusted so as to barely provide grinding action which constituted a 55% load on the refiner. To the treated slurry there was then added 272 grams of Marasperse C.B. (a mixture of lignin sulfonic acid compounds).

Sheets of the blend of encapsulated and unencapsulated glass fibers were made by passing the aqueous slurry onto the felt of the paper making machine in the usual manner and removing the water from the encapsulated and unencapsulated glass fibers. The resulting sheets had a smooth, soft suede feel. The sheets had a weight of about 126.5 grams/sq. ft. and had a thickness of 0.388 inch, and were dried in an oven having a temperature of about 415°–425° F. These sheets were compressed slightly between calendering rolls having a temperature of about 305° F. to produce lightly calendered sheets having a thickness of about 0.130 inch.

B. PREPARATION OF LAMINATE

Sheets of low carbon steel of approximately 4 ft. by 5 ft. and having a thickness of about 0.019 inch were washed on one side each with a hot (160° F.) aqueous solution of sodium metasilicate, rinsed with hot water and the washed surfaces treated with a chemical copper plating solution comprising 250 cc. of water, 5 grams of copper sulfate, 3 ccs. of concentrated sulphuric acid, 0.5 grams of ammonium nitrate and 0.1 gram of chromium trioxide. In the treatment, the plating solution, employed at room temperature, was wiped on the washed side of each of the steel plates while running cold tap water over the plate. The treated sheet was then rinsed with cold tap water and allowed to air dry for several days. The treated surface appeared to be coated with an extremely thin, film of partially oxidized copper. This treatment is important as it is necessary to produce a secure bond between the steel sheets and the sheets of polyethylene encapsulated glass fibers to survive the drawing operation.

A laminate was prepared by placing between the two treated low carbon steel sheets two layers of the sheets of the polyethylene encapsulated glass fibers of part A of this example, each being about 4 ft. by 5 ft. and about 0.13 inch thick, with the chemically plated surfaces of the treated steel sheets facing the sheets of encapsulated fiber glass. The resulting sandwich was placed in a flat mold having heated flat platens and heat applied to increase the temperature of the sandwich to about 300° F., in the absence of any substantial pressure. Pressure of about 540 pounds per square inch was then applied for a period of approximately two minutes. Thereafter the platens of the mold and the laminate were quickly cooled to a temperature of about 260° F., the pressure released, and the resulting sandwich or laminate removed from the mold.

Laminates formed in this manner have an adhesive shear strength of 2700 pounds per square inch and a peel strength when tested in accordance with ASTM D903–49 of about 160 pounds per linear inch.

C. COLD DRAWING THE LAMINATE

The laminate or sandwich produced in part B above was placed in a die mounted in a hydraulic press and subjected to the "draw die" technique to produce a drawn part having an 8 inch draw, without any tearing or ripping. The resulting form was found to have excellent properties.

The part was found to have excellent sound properties. While resonant vibrations may be easily induced and detected by ear with ordinary steel panels and drawn parts, such vibrations are hardly noticeable in the part produced in accordance with this example. Because of the thermal insulating properties of the polyethylene encapsulated fiber glass, the part does not conduct heat as would a part formed from ordinary steel. Particularly important is the economy provided for the drawn forms produced and the lightness of the part without loss of load bearing capacity. Not only is the polyethylene encapsulated glass fiber component much less expensive than steel sheets, but it is possible with the drawn forms of the present invention to provide the same load bearing capacity as drawn forms made solely of sheet steel and yet provide a substantial saving in weight.

Example II

A. PREPARATION OF LAMINATE

Sheets of bare aluminum, of the type suitable for drawing, of approximately 12 inches by 12 inches and having a thickness of about 0.019 inch were degreased by washing with acetone and the degreased surfaces immersed for 20 minutes in a solution comprising 5 parts by weight of sodium dichromate and 95 parts by weight of tap water, the solution being maintained at a temperature of about 170° F. The treated sheets were then rinsed with cold tap water, followed by a hot water rinse, and dried in a convection oven for 10 minutes at 200° F. This treatment of the aluminum surface is important as it is necessary to provide a secure bond between the aluminum sheets and the sheets of polyethylene encapsulated glass fibers to survive the drawing operation.

A laminate was prepared by placing between the two treated aluminum sheets two of the sheets of the polyethylene encapsulated glass fibers produced in part A of Example I, hereinabove, each being about 1 ft. by 1 ft. and about 0.13 inch thick, with the chemically treated surfaces of the treated alumium sheets facing the sheets of encapsulated glass fibers. The resulting sandwich was placed in a flat mold having heated flat platens and heat applied to increase the temperature of the sandwich to about 300° F., in the absence of any substantial pressure. Pressure of about 750 pounds per square inch was then applied for a period of approximately 30 seconds. Thereafter the platens of the mold and the laminate were quickly cooled to a temperature of about 260° F., the pressure released, and the resulting sandwich or laminate removed from the mold.

B. COLD DRAWING THE LAMINATE

The laminate or sandwich produced in part A above was sheared to a circular blank, placed in a die mounted in a hydraulic press and subjected to the "draw die" technique to produce a drawn part in the shape of a circular bowl, having a circumference of approximately 7½ inches and a depth of 2½ inches. The draw was made without failure in the sheet aluminum or in adhesion of the aluminum sheets to the core of polyethylene encapsulate. The resulting bowl was found to have excellent properties.

Example III

A. PREPARATION OF LAMINATE

Sheets of stainless steel of approximately 12 inches by 12 inches and having a thickness of about 0.019 inch were degreased with a hot (160° F.) aqueous solution of sodium metasilicate and the degreased surfaces washed with hot water. The sheets were then immersed for 3 minutes in a solution, maintained at a temperature of about 120° F., comprising 10% nitric acid, 4% hydrofluoric acid and 86% water (all percentages by volume). After removal from the solution, the sheets were rinsed in cold running tap water and allowed to air dry at room temperature. This treatment of the steel sheets is important as it is necessary to produce a secure bond between the steel sheets and the sheets of polyethylene encapsulated glass fibers to survive the drawing operation.

A laminate was prepared by placing between the two treated steel sheets two layers of the sheets of the polyethylene encapsulated glass fibers of part A of Example I hereinabove, each being about 12 inches by 12 inches and about 0.13 inch thick, with the chemically treated surface of the treated steel sheets facing the sheets of encapsulated glass fibers. The resulting sandwich was placed in a flat mold having heated flat platens and heat applied to increase the temperature of the sandwich to about 300° F., in the absence of any suitable pressure. Pressure of about 750 pounds per square inch was then applied for a period of approximately 30 seconds. Thereafter the platens of the mold and the laminate were quickly cooled to a temperature of about 260° F., the pressure released, and the resulting sandwich or laminate removed from the mold.

B. COLD DRAWING THE LAMINATE

The laminate or sandwich produced in part B above, being 0.13 inch in thickness, was sheared to a circular blank, placed in a die mounted in a hydraulic press and subjected to the "draw die" technique to produce a drawn part in the shape of a circular bowl, having a circumference of approximately 7½ inches and a depth of about 2½ inches, without any tearing or ripping. The resulting bowl was found to have excellent properties. It was light in weight and had the strength of laminate construction with the corrosion resistant surfaces of stainless steel.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A new article of manufacture comprising a drawn laminate structure having a plurality of layers of thin sheet metal and interposed therebetween and bonded thereto core layers being sheets of polyolefin encapsulated glass fibers.

2. A new article of manufacture comprising a drawn laminate structure having two outer layers of thin sheet steel and interposed therebetween and bonded thereto a core layer being a sheet of polyethylene encapsulated glass fibers.

3. A new article of manufacture comprising a drawn laminate structure having a plurality of layers of thin sheet steel and interposed therebetween and bonded thereto core layers being sintered sheets of polyolefin encapsulated glass fibers, said bonding being effected by means of a thin chemically plated film of partially oxidized copper applied to the steel surfaces facing the core layers of sintered sheets of polyolefin encapsulated glass fibers.

4. A new article of manufacture as defined by claim 3, wherein the sintered sheets are made up of polyolefin encapsulated glass fibers and unencapsulated glass fibers and wherein the unencapsulated glass fibers are about one-eighth inch in length and comprise about 5% by weight of the sintered sheets and 95% by weight of the sheet is made up of polyolefin encapsulated glass fibers.

5. A new article of manufacture comprising a drawn laminated structure possessing compound curvature, said laminated structure having a plurality of layers of thin sheet metal and interposed therebetween and bonded thereto core layers being sheets of polyolefin encapsulated glass fibers.

6. A new article of manufacture comprising a drawn laminated structure possessing compound curvature, said laminated structure having two outer layers of thin sheet steel and interposed therebetween and bonded thereto a core layer being a sintered sheet of polyethylene encapsulated glass fibers.

7. A new article of manufacture comprising a drawn laminated structure possessing compound curvature, said laminated structure having two outer layers of thin sheet steel and interposed therebetween and bonded thereto a core layer being a sintered sheet of polyolefin encapsulated glass fibers, the bonding surfaces of the sheet steel layers having a partially oxidized copper coating thereon.

8. A new article as defined by claim 7 wherein the polyolefin is polyethylene.

9. The method for making a drawn laminated structure comprising the steps of:
 (1) placing a laminated sheet having a plurality of layers of thin sheet metal and interposed therebetween and bonded thereto core layers being sheets of polyolefin encapsulated glass fibers over a die, said laminated sheet being retained in position by the application of a predetermined degree of pressure to the outer upper surface area of the sheet;
 (2) forming the drawn structure by moving a punch against the top surface of the laminated sheet to force the laminated sheet into the die, the metal layers and core layers flowing into the die in a uniform manner without rupture of the bond between them.

10. The method for making a drawn laminated structure comprising the steps of:
 (1) placing a laminated sheet having two outer layers of thin sheet steel and interposed therebetween and bonded thereto a core layer being a sintered sheet of polyolefin encapsulated glass fibers over a female die, said laminated sheet being retained in position by the application of a predetermined degree of pressure to the outer upper surface area of the sheet;

(2) forming the drawn structure by moving a male punch against the top surface of the laminated sheet to force the laminated sheet into the female die, the steel layers and core layer flowing into the die in a uniform manner without rupture of the bond between them.

11. The method for making a drawn laminated structure comprising the steps of:

(1) placing a laminated sheet having two outer layers of thin sheet steel and interposed therebetween and bonded thereto by a film of partially oxidized copper on said layers of sheet steel, a core layer being a sintered sheet of polyethylene encapsulated fiber glass particles over a female die, said laminated sheet being retained in position by the application of a predetermined degree of pressure to the outer upper surface area of the sheet;

(2) forming the drawn structure by moving a male punch down against the top surface of the laminated sheet to force the laminated sheet into the female die, the steel layers and core layer flowing into the die in a uniform manner without rupture of the bond between them.

References Cited

UNITED STATES PATENTS

| | | | |
|---|---|---|---|
| 2,551,591 | 5/1951 | Foord | 117—132 |
| 2,829,118 | 4/1958 | Wehr | 117—132 |
| 3,083,118 | 3/1963 | Bridgeford | 117—126 |
| 3,121,698 | 2/1964 | Orsinio et al. | 117—100 |

EARL M. BERGERT, *Primary Examiner.*

DOUGLAS J. DRUMMOND, *Examiner.*